United States Patent [19]

Suzuki et al.

[11] Patent Number: 4,545,767
[45] Date of Patent: Oct. 8, 1985

[54] TRAINING OPERATION SYSTEM AND SIMULATOR FOR TRAINING IN ELECTRIC POWER SYSTEM

[75] Inventors: Mamoru Suzuki, Tokyo; Hiromoto Tanaka, Hyogo, both of Japan

[73] Assignees: The Tokyo Electric Power Company Inc.; Mitsubishi Denki Kabushiki Kaisha, both of Tokyo, Japan

[21] Appl. No.: 552,352

[22] Filed: Nov. 16, 1983

[30] Foreign Application Priority Data

Dec. 17, 1982 [JP] Japan .................................. 57-201516

[51] Int. Cl.[4] ............................................... G09B 9/00
[52] U.S. Cl. ........................................................ 434/224
[58] Field of Search .......................... 434/219, 224, 366

[56] References Cited

U.S. PATENT DOCUMENTS 3,237,318  3/1966  Schager ................................ 434/219
3,823,490  7/1974  Konik et al. .......................... 434/219

Primary Examiner—William H. Grieb
Attorney, Agent, or Firm—Bernard, Rothwell & Brown

[57] ABSTRACT

A training simulator for selectively executing one of training items of simulation bases to be executed by the operation on a trainer console requesting the responsive operation on a trainee console of storing a current time and information of current training status in response to reception of a first command from the trainer console, and of reviewing the executed training item in accordance with the stored current time and information in response to reception of a second command from the trainer console.

3 Claims, 7 Drawing Figures

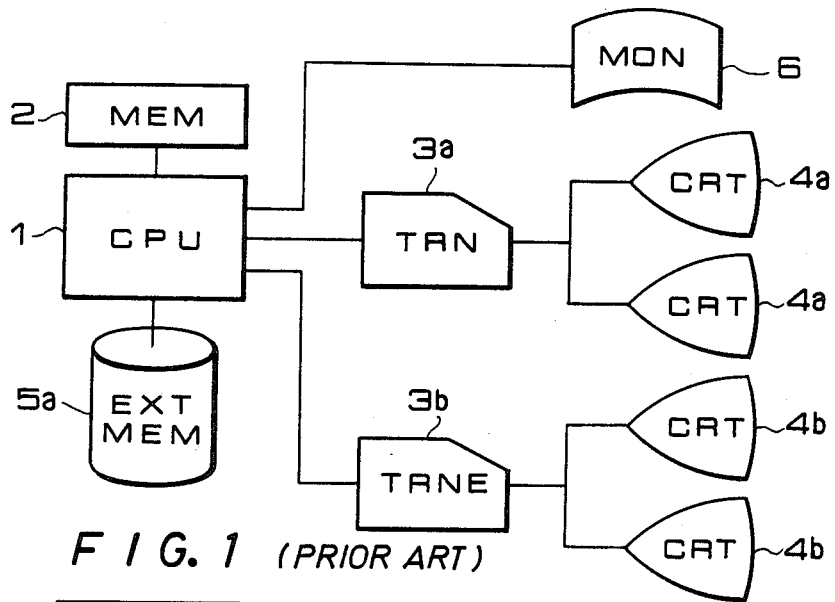
FIG. 1 (PRIOR ART)
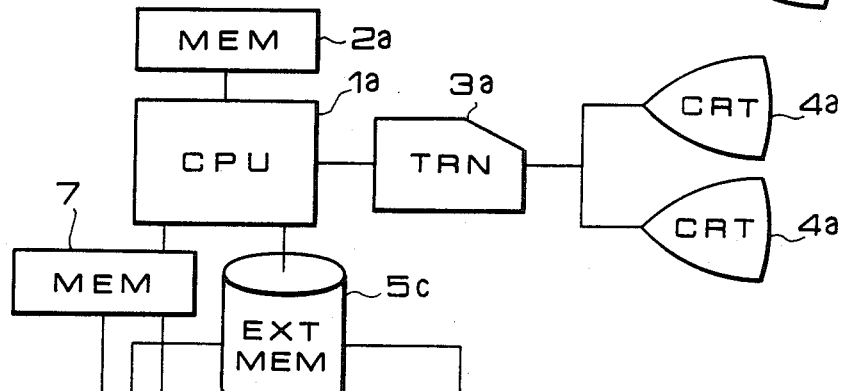
FIG. 3
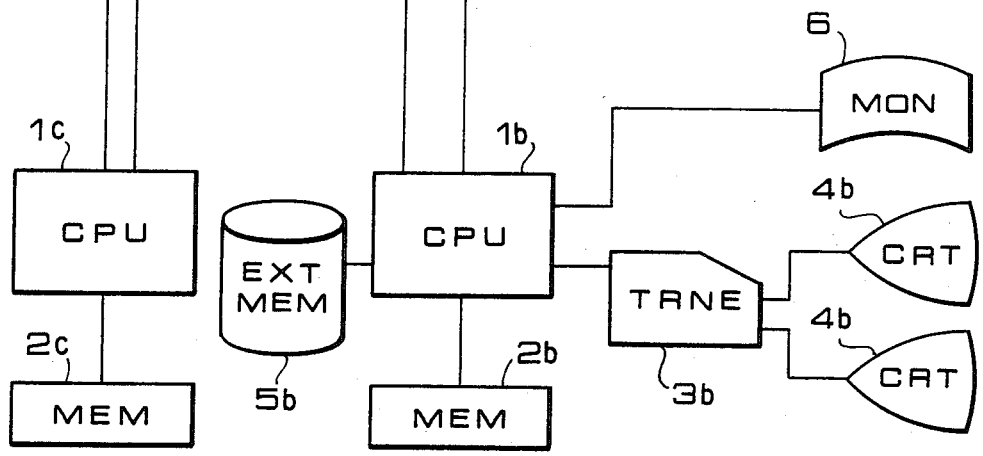

FIG. 2 (1) (PRIOR ART)

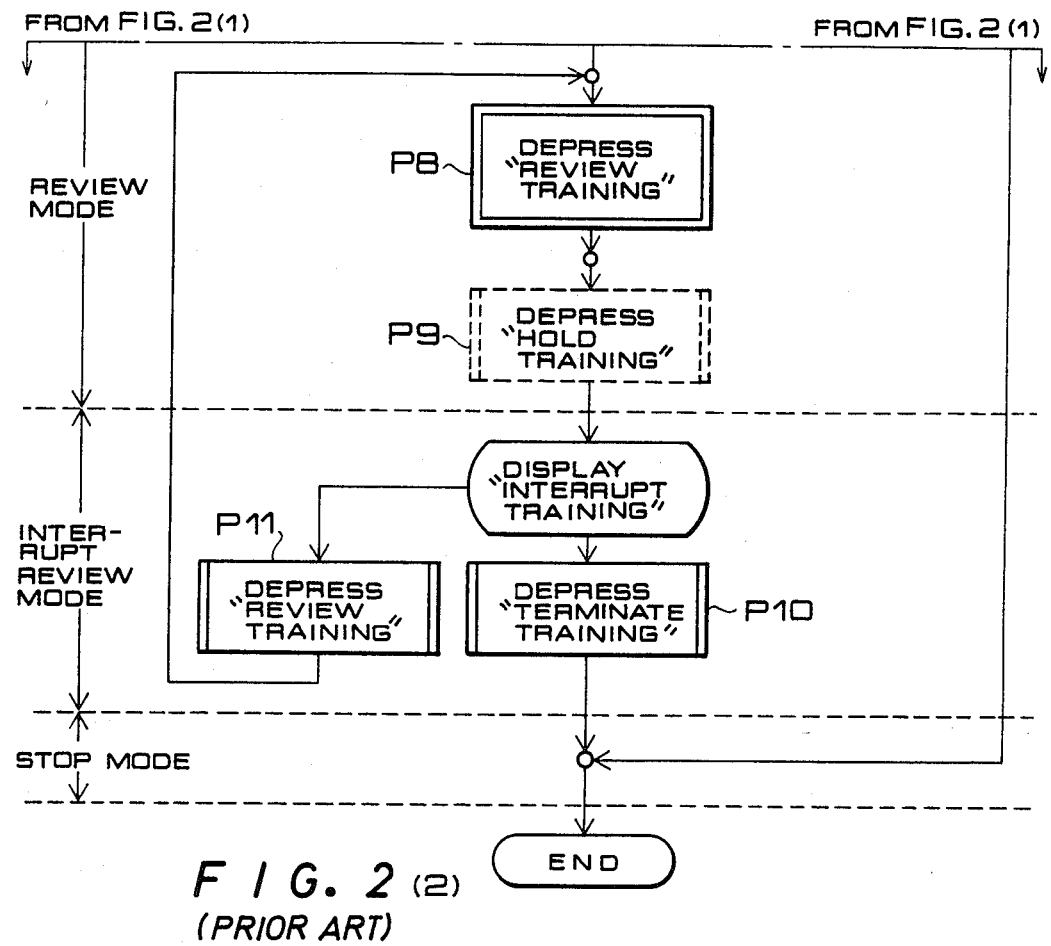
F I G. 2 (2)
(PRIOR ART)
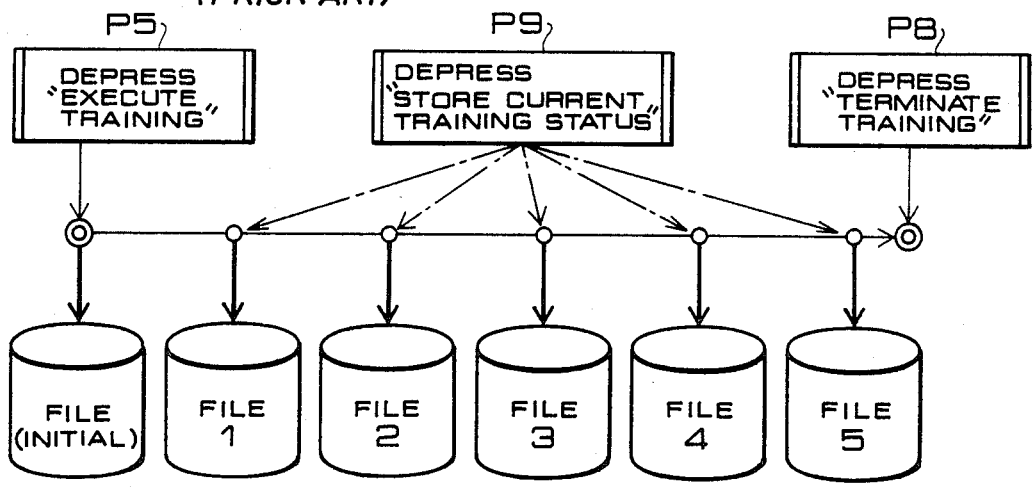
F I G. 5

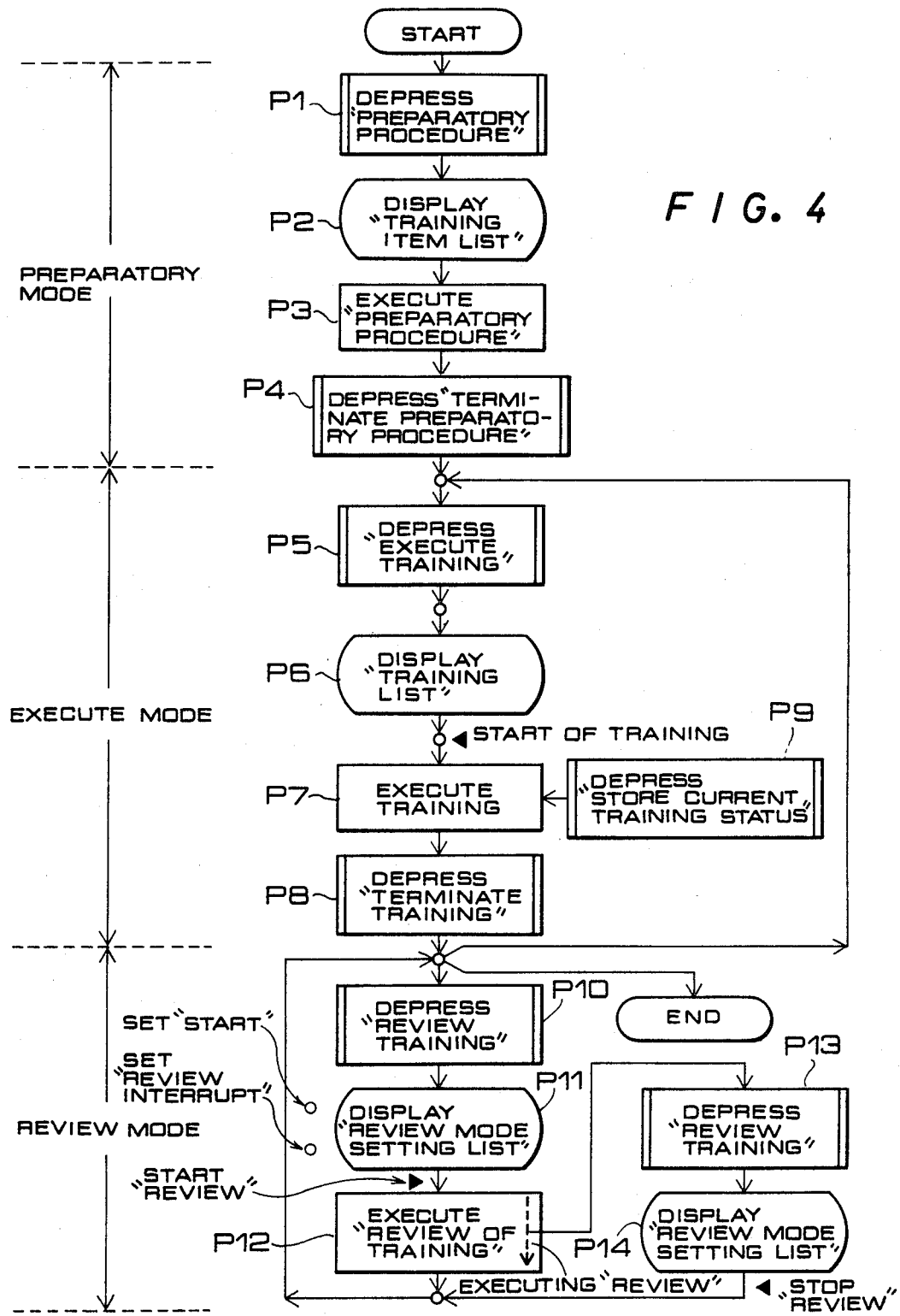

TRAINING OPERATION SYSTEM AND SIMULATOR FOR TRAINING IN ELECTRIC POWER SYSTEM

FIELD OF THE INVENTION

The present invention relates to a computer-aided simulator and more particularly to a simulator for training an operator of a plant such as an electric power system.

BACKGROUND OF THE INVENTION

The operators working in the load-dispatching office or the like of a power company are required to be well-trained so that they are ready to take appropriate measures when accident occurs, not to mention in the routine operation of the power system.

A conventional training simulator for training such operator is shown in FIG. 1 wherein a central processing unit (CPU) 1 comprised of a digital computer, a main storage (MEM) 2, a trainer console (TRN) 3a, a trainee console (TRNE) 3b, character display units (CRT) 4a connected to the trainer's console, character display units (CRT) 4b connected to the trainee console, an external memory (EXT MEM) 5a and a system monitoring unit (MON) 6.

The operation of the simulator will be described with reference to FIG. 2 in the case of performing training. A trainer operates setting operations via the console 3a and the character display unit 4a to generate a training pattern and its registration. In order to execute actual training, the trainer console is operated to give a command "EXECUTE TRAINING" (Steps P1 and P2) to establish the execution mode of the simulator. During the execution mode, the training may be terminated by the depression of a TERMINATE TRAINING button on the trainer console at an appropriate timing. The training can be interrupted upon the depression of an "INTERRUPT TRAINING" button on the trainer console (This mode is designated as an execution interrupt mode) (Step P4). The training can be terminated during the execution interruption mode (Step P3). The depression of a "REVIEW TRAINING" button causes the simulator to review the contents of the training from the start (This mode is designated as a review mode) (Step P6). The looping to the execution mode (Step P2) is attained by the depression of an "EXECUTE TRAINING" button (Step P7). In the review mode, the review of the training can be interrupted upon the depression of an "INTERRUPT REVIEW" button on the trainer's console. This mode is designated as a review interrupt mode (Steps P8 and P9). During the review interrupt mode, the training can be terminated upon the depression of a "TERMINATE TRAINING" button on the trainer console (Step P10). The depression of the "REVIEW TRAINING" button on the trainer console (Step P11) enables the restart of the training (repetition of Step P8) from the point of interruption.

Such a simulator is capable only of repeating a training program from the start thereof. Therefore, a long access time is required until a desired training pattern is accessed and furthermore, since the routine is returned to the start thereof, the desired training pattern can not be restarted under the same condition as that of the previous training contents are initialized.

OBJECTS OF THE INVENTION

It is, therefore, an object of the present invention to provide a training simulator for storing various information which is necessary for reviewing a training during the training operation to allow review of the training from any specified time.

It is another object of the present invention to provide a training simulator capable of repeatedly executing a particular training through the selective operation of the operator.

BRIEF DESCRIPTION OF THE DRAWINGS

FIG. 1 is a block diagram showing the system configuration of a conventional training simulator;

FIG. 2 is a flowchart showing the steps of the operation of the training simulator of FIG. 1;

FIG. 3 is a block diagram showing the system configuration of a preferred embodiment of a training simulator according to the present invention;

FIG. 5 is a flowchart showing the partial operation of the training simulator of FIG. 3;

SUMMARY OF THE INVENTION

Figure 4:
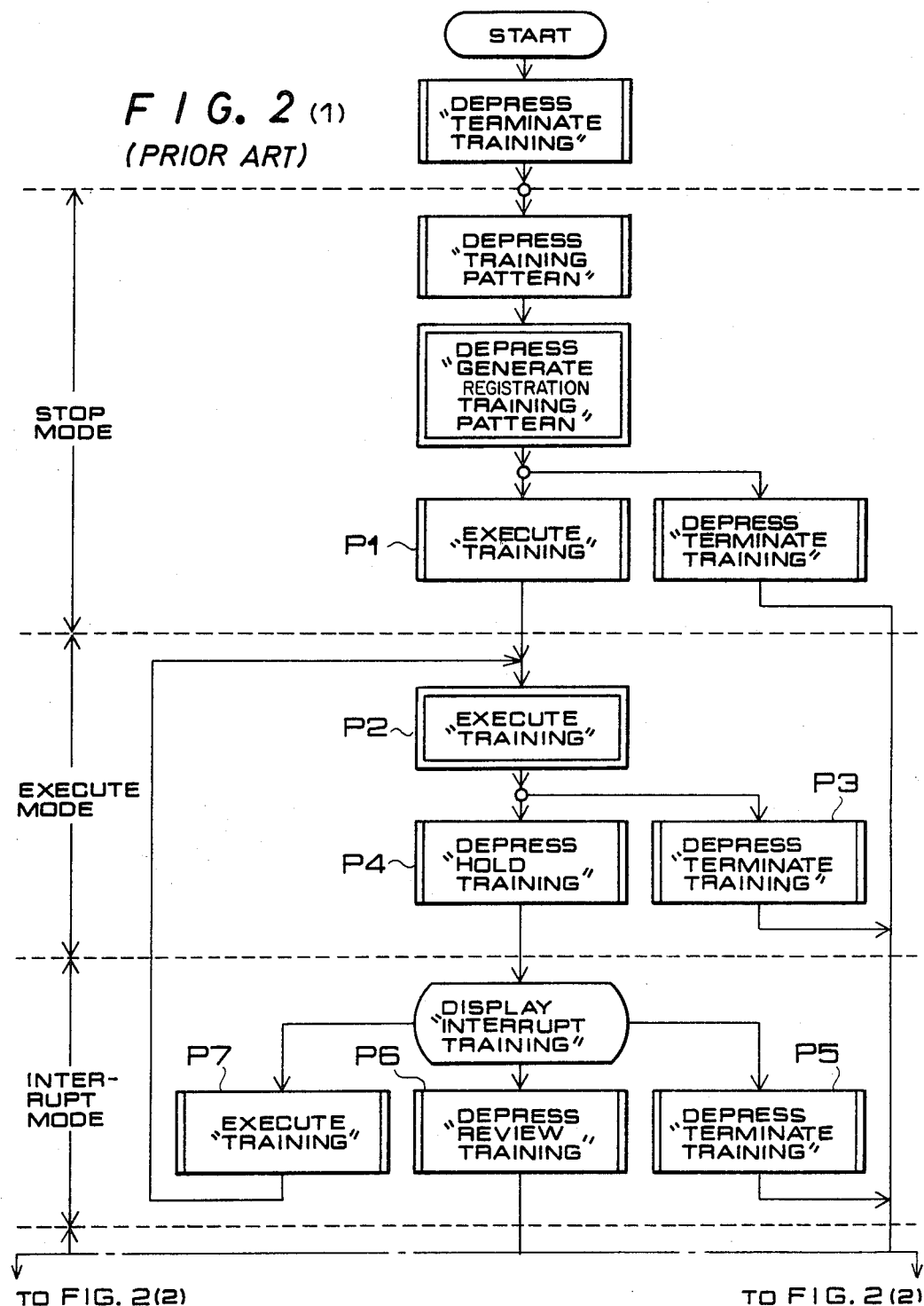
FIG. 4 is a flowchart showing the process of the operation of the training simulator of FIG. 3.

A training simulator according to the present invention, comprises trainer input-output means provided with a plurality of buttons respectively corresponding to a plurality of training items of simulation program for manually selecting one of the training items to be subsequently executed; trainee input-output means for entering proper data corresponding to a simulated condition provided through the execution of the selected training item; and processing means connected both to the trainer input-output means and to the trainee input-output means, for recording a current time and information of a current state regarding a training program in a predetermined memory upon the reception of a first command whereby said simulator may read out the current time and the information of the current state from the memory in response to the reception of a second command to repeat the training program, and restarting in accordance with the stored current time and the information of the current state from a time designated by the second command.

The processing means may comprise a first central processing unit and a second central processing unit for controlling the trainer and the trainee input-output means and the input-output of the data including the commands, respectively, and a third central processing unit connected to said central processing units for executing a training item designated by the command received therewith.

Each input-output means may be provided with a character display. The character display may be arranged to select via a light pen one of a plurality of training items displayed on a screen thereof, which are subsequently executable.

DETAILED DESCRIPTION OF THE INVENTION

Referring now to FIG. 3 which shows a systematic configuration of a preferred embodiment of the present invention, wherein like or the corresponding elements with FIG. 1 are designated by the same reference numerals except reference characters "a", "b" and "c" are affixed thereto, there are shown a central processing unit $1a$ (CPU) including a digital computer and adapted to play the role of a trainer, a central processing unit $1b$ including a digital computer for processing data and programs associated with a trainee, a central processing unit $1c$ including a digital computer for simulating operation of a power network, various plants etc, a main storage $2a$, a trainer console $3a$, a character display $4a$ buit in the trainer console, a shared main storage 7 accessible by all the central processing units, a main storage $2b$, a trainee console $3b$, a character displays $4b$ built connected to the trainee console, an external memory $5b$, a network monitoring panel 6, a main storage $2c$, and an external memory $5c$ accessible to all the central processing units.

The operation of the training simulator thus constituted will be described in reference with FIG. 4.

Figure 6:
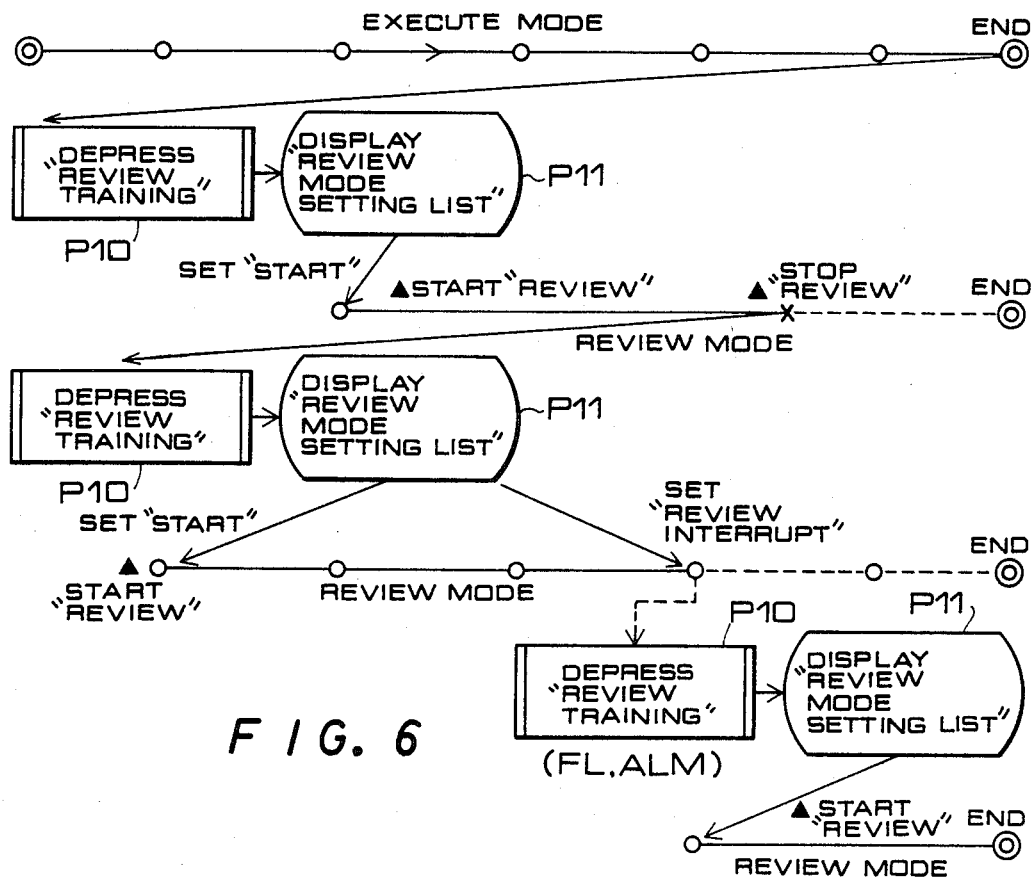
FIG. 6 is a flowchart showing the transitional operation of the training simulator according to the present invention.
Figure 7:
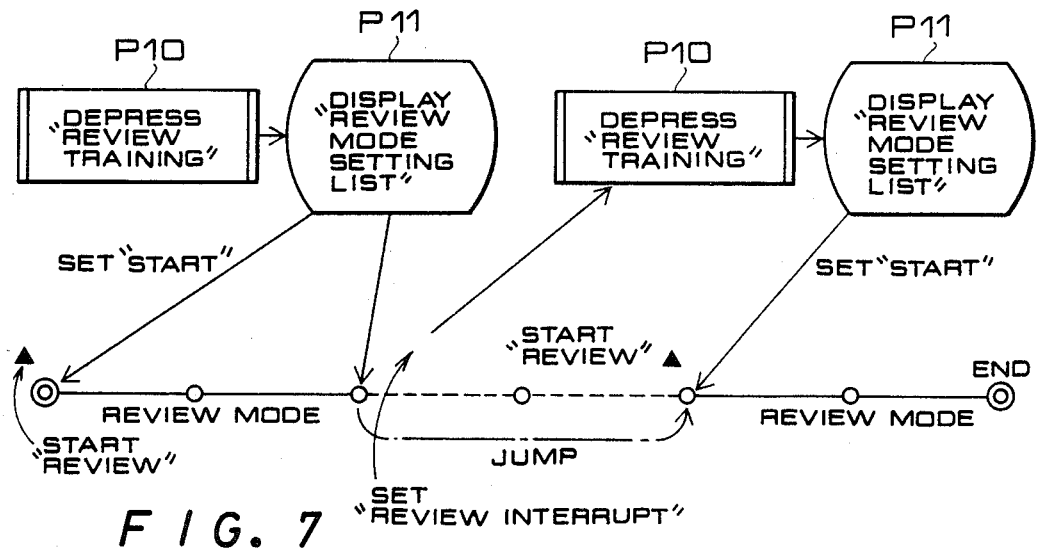
FIG. 7 is a flowchart showing the transitional operation of a training simulator according to the present invention.

After starting the routine, the generation and the registration of a training pattern (designated as "PREPARATORY PROCEDURE") is performed by the use of the trainer console $3a$ and the character displays $4a$ (Steps P1 to P3). This procedure is accomplished by depressing a "TERMINATE PREPARATORY PROCEDURE" button (Step P4). In order to start an actual training an "EXECUTE TRAINING" button on the trainer console is depressed (Step P5) so that the execution mode of the training simulator is established (Steps P6 and P7). During the execution mode, a trainer is able to terminate the training operation by depressing a "TERMINATE TRAINING" button at a desired instant (Step P8). As shown in FIG. 5, when a "STORE CURRENT TRAINING STATUS" button is depressed at a significant scene during the training, the time of depression of the button, the status of the system (plant) and the operating status are stored in a file (Step P9). In FIG. 5, the possible maximum number of executing times of the depression of the button is five, however, the number of times can be increased by increasing the number of files. Those contents stored will become the next initial state or the final state at the review of the training, which will be described afterward. When the review of training is required after the completion of the training, a "REVIEW TRAINING" button is depressed (Step P10) to display a REVIEW MODE SETTING LIST (Step P11), whereby a review start and end time are set, which are counted from the instant the "STORE CURRENT TRAINING STATUS" button was depressed during the execution of the training, and then an indication "Start Repetition" displayed on the character display $4a$ is designated with a light pen to start the repetition of the training program (Step P12). When the review of the training is desired to stop midway, the "REVIEW TRAINING" button is depressed (Step P13) to display the REVIEW MODE SETTING LIST on the character displays (Step P14) and a designation of STOP REVIEW with a light pen terminates the repetition mode. If the "REVIEW TRAINING" button is not depressed during the review, the review operation is continued until it comes to end. In either case, the review of the training can be made any number of times as desired by newly setting of a review start and end time. FIG. 6 is a flowchart showing the operation of training review by modifying the flowchart of FIG. 4. As shown in FIG. 7, a modification of FIG. 4, the review of the training is jumped by setting a skip for the second start and end time.

In this embodiment, provision is not made for an execution stop mode in a training execution mode which is provided in a conventional training simulator, however, it is possible to provide an additional means capable of interrupting the execution at a certain time by depressing the "STORE CURRENT TRAINING STATUS" button to proceed to an interrupt mode.

What is claimed is:

1. A training operation system and simulator for training in electric power system comprising:
   trainer input-output means having a plurality of buttons respectively corresponding to a plurality of training items regarding training simulation for manually selecting one of said items to be subsequently operated;
   trainee input-output means for entering proper data in response to the simulated conditions provided through the execution of the selected training item; and
   processing means connected both to the trainer input-output means and to the trainee input-output means for storing, upon request, in a predetermined storage means a current time and the information of current status regarding the training in response to a first command from the trainer input-output means and for reviewing the training from a time designated by the current time and the information which corresponds to a part or whole of the requested training pattern read out in response to reception of a second command commanding to review the training.

2. A training simulator according to claim 1, wherein the processing means comprises a first central processing unit and a second control processing unit for controlling the trainer and the trainee input-output means to input/output data including said commands respectively; and a third central processing unit connected both to the first and the second central processing units for executing a training item designated by said command.

3. A training simulator according to claim 1, wherein each of said input-output means has a character display arranged to select via a light pen one of said training items being subsequently executable displayed on a screen thereof.

* * * * *